United States Patent [19]
Niechcial

[11] Patent Number: 5,910,042
[45] Date of Patent: Jun. 8, 1999

[54] ICE BLASTING CLEANING SYSTEM AND METHOD

[75] Inventor: Roman Niechcial, Longview, Wash.

[73] Assignee: Inter Ice, Inc., La Quinta, Calif.

[21] Appl. No.: 08/877,928

[22] Filed: Jun. 18, 1997

Related U.S. Application Data

[63] Continuation-in-part of application No. 08/801,190, Feb. 18, 1997, Pat. No. 5,820,447.

[51] Int. Cl.⁶ .................................. B24B 1/00; B24B 7/00
[52] U.S. Cl. ................................. 451/39; 62/321; 451/53; 451/60; 451/99; 451/446
[58] Field of Search ................................. 62/71, 74, 321, 62/346, 347, 545; 451/38, 39, 53, 60, 99, 102, 446

[56] References Cited

U.S. PATENT DOCUMENTS

| | | |
|---|---|---|
| 402,968 | 5/1889 | Railsback . |
| 2,549,215 | 4/1951 | Mansted . |
| 2,699,403 | 1/1955 | Courts . |
| 2,749,722 | 6/1956 | Knowles . |
| 3,400,548 | 9/1968 | Drayer . |
| 3,494,144 | 2/1970 | Schill . |
| 4,038,786 | 8/1977 | Fong . |
| 4,125,969 | 11/1978 | Easton . |
| 4,389,820 | 6/1983 | Fong et al. . |
| 4,420,957 | 12/1983 | Weber . |
| 4,512,160 | 4/1985 | Mas . |
| 4,617,064 | 10/1986 | Moore . |
| 4,655,847 | 4/1987 | Ichinoseki et al. . |
| 4,703,590 | 11/1987 | Westergaard . |
| 4,965,968 | 10/1990 | Kelsall . |
| 5,203,794 | 4/1993 | Stratford et al. . |
| 5,367,838 | 11/1994 | Visaisouk et al. . |
| 5,601,147 | 2/1997 | Lowe et al. . |
| 5,601,478 | 2/1997 | Mesher . |
| 5,623,831 | 4/1997 | Mesher . |

FOREIGN PATENT DOCUMENTS

| | | |
|---|---|---|
| 1321478 | 8/1993 | Canada . |
| 1324591 | 11/1993 | Canada . |

OTHER PUBLICATIONS

"Supersonic Abrasive Ice–Blasting," An Environmentally Friendly Method of Removing Paint Or Grease From Surfaces, Developed with NSF Funding, internet posting by Beth Gaston, Oct. 5, 1994, pp. 1–2.

"Ice Flake Air Jet Surface Cleaner", internet marketing information and correspondence, The Initiative Center of the Negev, Jun. 27 and 28, 1996, pp. 1–2.

*Primary Examiner*—Timothy V. Eley
*Attorney, Agent, or Firm*—Chernoff, Vilhauer, McClung & Stenzel, LLP

[57] ABSTRACT

An ice blasting cleaning system including an ice maker that creates ice particles, at least one separator that separates snow from the ice particles, a hopper into which the ice particles enter, and a blasting gun that receives the ice particles and propels them toward the surface to be cleaned. The separator may be for example, an air blower, an ice breaker plate set at a steep angle, a heated or a cooled ice breaker plate, or a rotating brush. The present invention also includes an ice blasting cleaning method for cleaning a surface using ice particles as the cleaning agent. The method includes creating ice particles and snow, separating the ice particles from the snow, the ice particles entering a hopper, and propelling the ice particles toward the surface to be cleaned.

26 Claims, 6 Drawing Sheets

ICE BLASTING CLEANING SYSTEM AND METHOD

This application is a continuation-in-part of U.S. patent application Ser. No. 08/801,190 filed Feb. 18, 1997 now U.S. Pat. No. 5,820,447.

BACKGROUND OF THE INVENTION

The present invention relates to a cleaning system that uses ice blasting and particularly to a system that uses coated ice particles as the cleaning agent.

Sand or grit blasting—propelling small granules of abrasives, such as sand or glass beads, towards surfaces such as walls, floors, and ceilings—has been widely used to clean surfaces that are dirty or have an unwanted coating (such as paint or graffiti). Grit blasting has several problems. For example, grit blasting is extremely abrasive which is damaging to the surface being cleaned. Also, the abrasives are expensive to obtain and become contaminated with the removed material after one use. Further, once the abrasives are contaminated they must be collected, a time consuming and often difficult proposition, and properly disposed since contaminated abrasives are usually not reusable. Since disposal costs are based on the weight of the material to be disposed, disposing of the abrasives along with the contaminants is extremely expensive.

Ice blasting, a process that uses ice or frozen material instead of traditional abrasives, solves some of the problems of grit blasting. For example, ice is generally not abrasive. Another example is that, if water is the frozen material, it is relatively inexpensive to obtain and is generally only needed in small quantities. Also, depending on where the ice blasting is being done and the type of coating that is being removed, the contaminated ice particles often can be allowed to melt and evaporate and thus little or no collection would be necessary. Still further, depending on the removed material, disposal may be done after the water has evaporated which leaves only a small amount of removed material for disposal.

Ice blasting has several other advantages. For example, it can remove soft or hard coatings such as grease, tar, paint, and even radioactive contaminants without damaging the underlying substrate. It is also dustless.

Stratford et al. U.S. Pat. No. 5,203,794, Fong U.S. Pat. No. 4,038,786, Moore U.S. Pat. No. 4,617,064, and Fong et al. U.S. Pat. No. 4,389,820 disclose blasting apparatus that uses sublimable particles such as $CO_2$ as the cleaning agent. Although these devices are generally preferable to grit blasters, they still present several problems. For example, $CO_2$ generally comes in particles or in a dry ice block and is therefore expensive. Also, $CO_2$ is more difficult to obtain than water.

Visaisouk et al. U.S. Pat. No. 5,367,838, Ichinoseki et al. U.S. Pat. No. 4,655,847, Westergaard U.S. Pat. No. 4,703,590, and Kelsall U.S. Pat. No. 4,965,968 are directed to ice blast cleaning systems that can use ice formed from water as the cleaning agent. The ice blasting systems disclosed in these patents are troublesome, complicated, limited in use, and very expensive.

More specifically, the known ice blasting systems are troublesome to use because they have configurations that have ice flow that is very unstable and requires frequent adjustments. Further, these systems suffer from recurrent ice build-ups or ice plug-ups that cause expensive machine operation delays. These ice build-ups or plug-ups often occur when the temperature of a system raises above freezing and then goes below freezing again. Accordingly, known systems do not function properly in environments above freezing.

To prevent ice build-ups and ice plug-ups, known systems use complicated designs because they must stay below freezing in order to function. Accordingly, all or part of each of these systems has to be cooled down to below freezing which uses significant energy and adds complicated and costly cooling and control devices.

SUMMARY OF THE PRESENT INVENTION

The ice blasting cleaning system of the present invention overcomes the aforementioned problems. Preferably, the system includes an ice maker that creates ice particles, at least one separator that separates snow from the ice particles, a hopper into which the ice particles enter, and a blasting gun that receives the ice particles and propels them toward the surface to be cleaned.

In one embodiment of the invention, the separator is an air blower that preferably blows warm air. As shown, the airblower has a length of tubing having at least one aperture through which the warm air flows. In an alternate embodiment, the separator is an ice breaker plate set at a steep angle. In still other embodiments of the invention, the separator may be a heated or a cooled ice breaker plate. Other embodiments of the invention may include a mechanical separator such as a rotating brush.

Preferrably the hopper has sides adapted to allow falling particles to settle thereon to form settlage. Preferably the sides have steps or rungs for this purpose. The settlage on the sides of the hopper serves two purposes: it keeps the temperature within the hopper cold and it melts to form meltage. The meltage keeps ice particles cold as they are being propelled toward the surface by the blasting gun.

The present invention also includes an ice blasting cleaning method for cleaning a surface using ice particles as the cleaning agent. The first step of the method is to create ice particles and snow. Then the ice particles are separated from the snow. The ice particles then enter a hopper. Finally, the ice particles are propelled toward the surface to be cleaned. Except for the step of creating the ice particles, the method is generally accomplished in an above freezing environment.

The foregoing and other objectives, features, and advantages of the invention will be more readily understood upon consideration of the following detailed description of the invention, taken in conjunction with the accompanying drawings.

DETAILED DESCRIPTION OF THE PREFERRED EMBODIMENT

Figures 1, 2A:
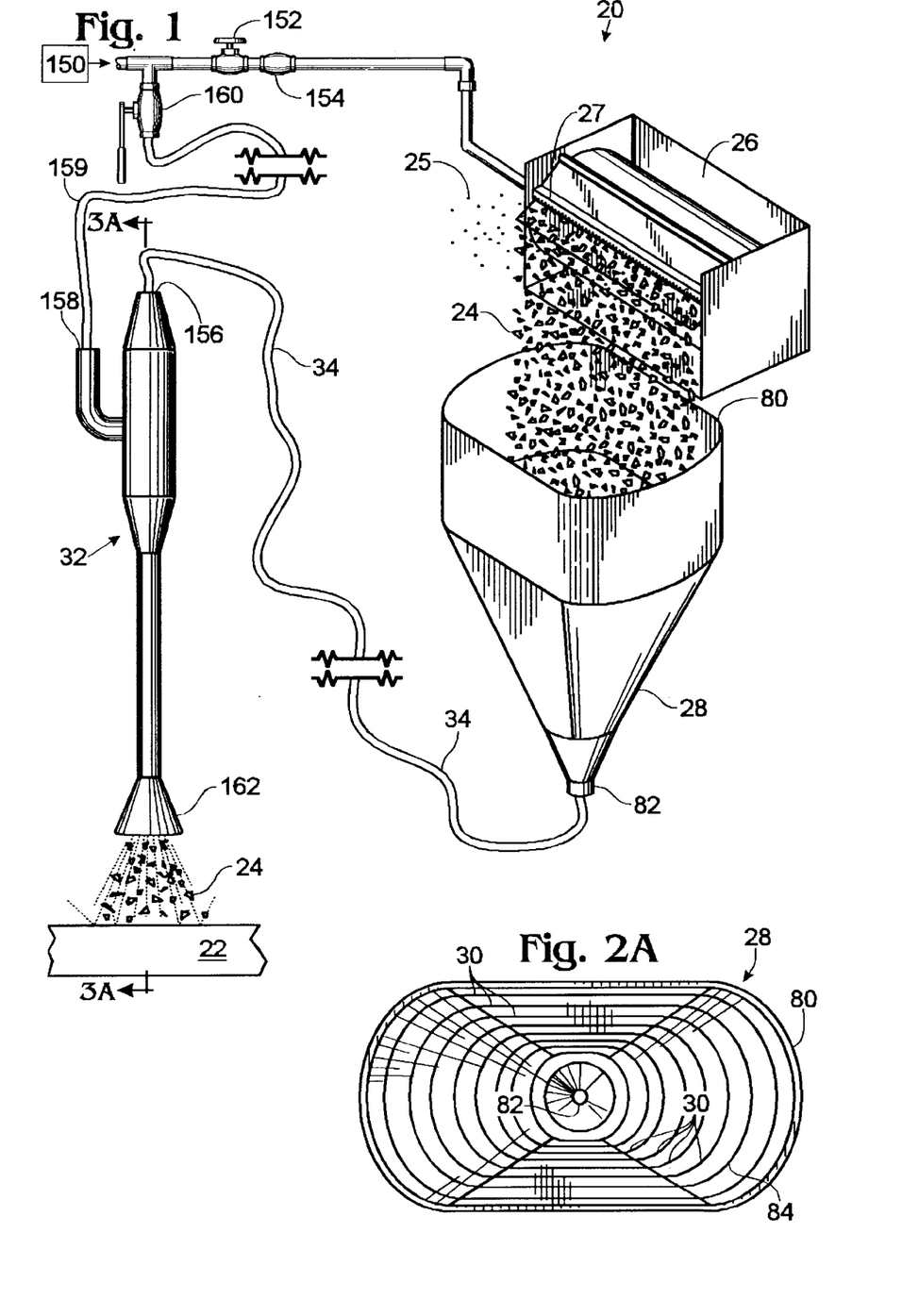
FIG. 1 is a perspective view of one embodiment of the ice blasting cleaning system of the present invention.
FIGS. 2A–2C are top views of alternate exemplary embodiments of a hopper.

Referring to FIG. 1, an ice blasting cleaning system 20 of the present invention is used for cleaning a surface 22 with ice particles 24. As shown, the system 20 generally includes an ice maker 26 that creates the ice particles 24 and snow 25, a separator (shown as square tubing 27) that separates the ice particles 24 from the snow 25, a hopper 28 that preferably has steps 30 (FIGS. 2A–2E), and a blasting gun 32 (FIGS. 3A–3B) connected to the hopper 28 by a hose 34.

Figures 2B, 2C, 2D:
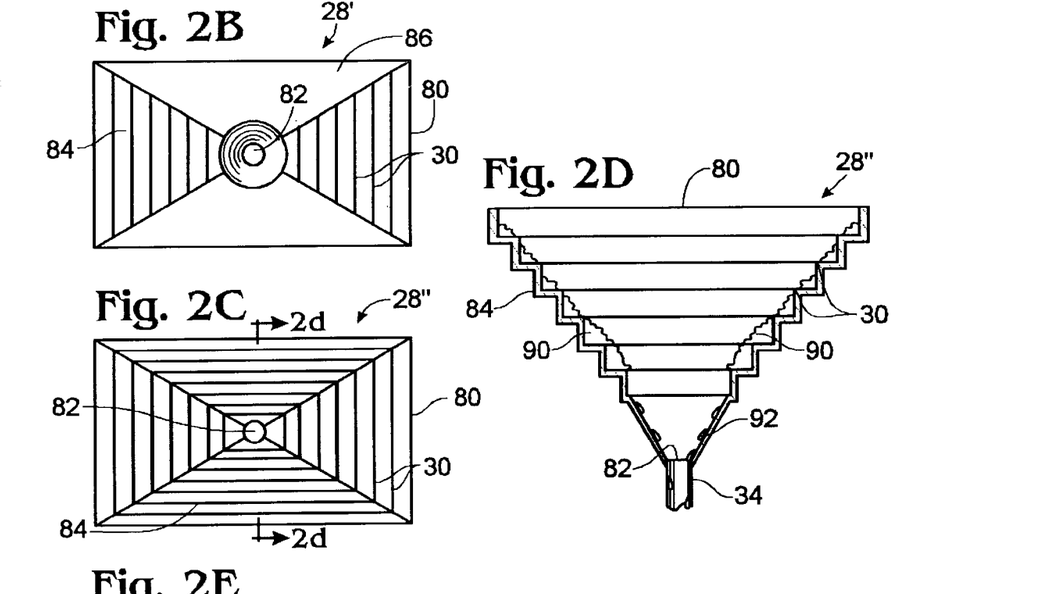
FIGS. 2D–2E are cross-sectional side views of alternate exemplary embodiments of a hopper.
Figures 2E, 4A:
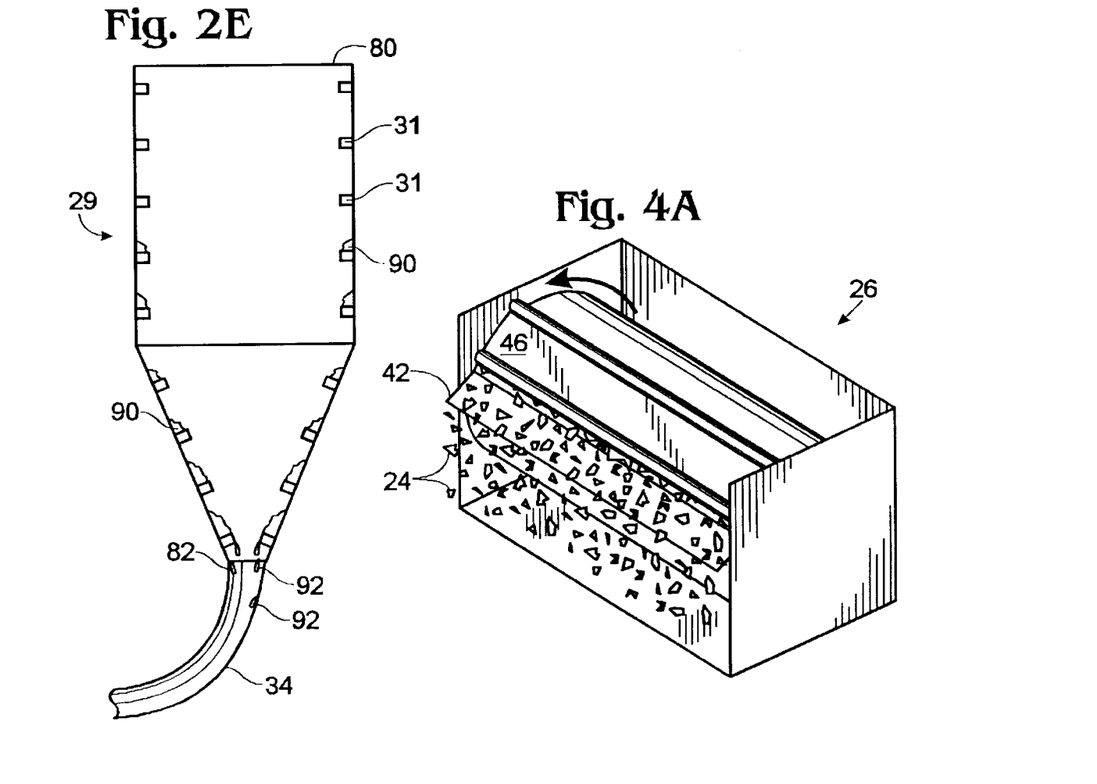
FIG. 4A is an exemplary ice maker with a sizing shield.
Figure 4B:
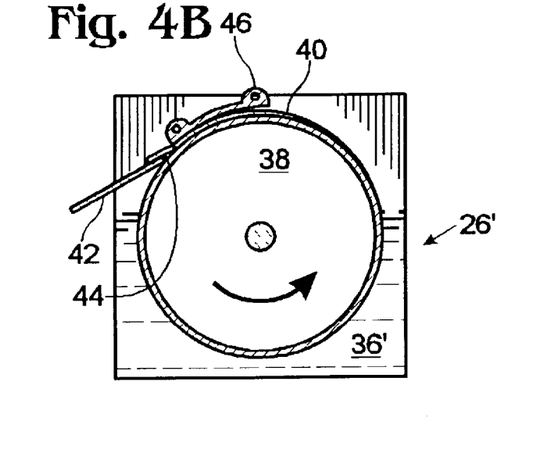
FIGS. 4B and 4C are cross sectional side views of exemplary embodiments of an ice maker with a sizing shield.
Figure 4C:
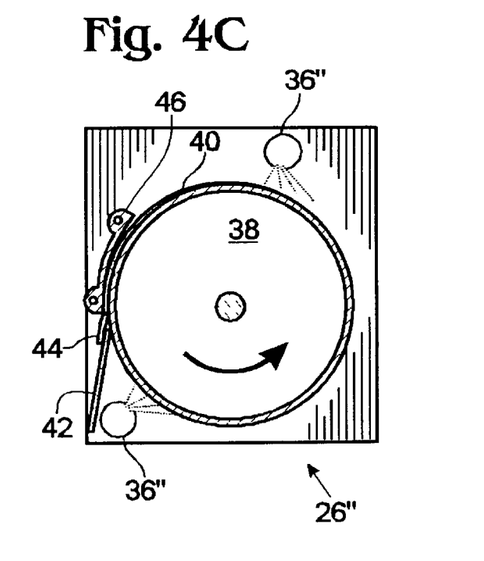

An ice maker 26, 26', 26" as shown in FIGS. 4A–4C, preferably creates relatively small ice particles 24 as well as snow 25. As discussed in U.S. patent application Ser. No. 08/801,190 from which this application is a continuation-in-part, alternate ice makers may be used. However, the shown ice makers 26, 26', 26" are horizontal drum ice makers that create a specific type of ice particles 24 (or ice flakes) of relatively even and small size as well as snow 25.

More specifically, each ice maker 26, 26', 26" includes a water source for supplying water that is applied to a rotating drum 38. The water source may be a reservoir 36' (FIG. 4B) through which a rotating drum 38 rotates or it may be one or more sprayers 36" (FIG. 4C) that sprays a coat of water on the rotating drum 38. The rotating drum 38 is preferably cooled or refrigerated so that the coat of water freezes to form an ice coating 40 on the rotating drum 38.

The ice maker 26 also includes an ice breaker plate 42 with a scraping edge 44. The ice breaker plate 42 is preferably positioned at an angle to the rotating drum 38 so that the scraping edge 44 is substantially adjacent to the rotating drum 38. It should be noted that the scraping edge 44 should be far enough from the rotating drum 38 so that the drum can still rotate, but close enough to allow the scraping edge 44 to scrape the ice coating 40 from the rotating drum 38 as it rotates. Notches 45 (FIG. 6) on the breaker plate 42 help to lift and separate the ice particles 24.

Figure 5A:
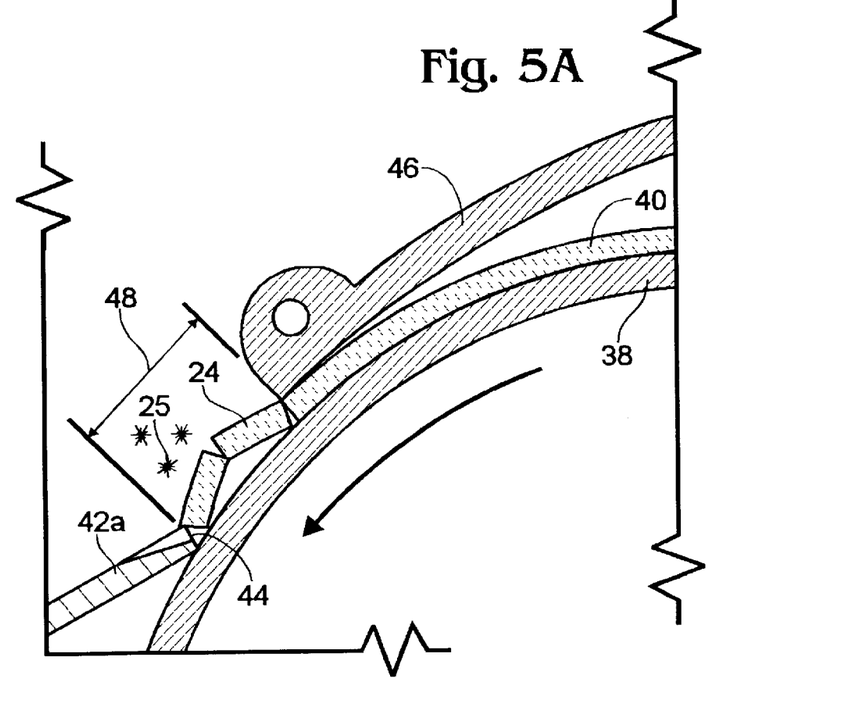
FIGS. 5A–5D are enlarged cross sectional side views of ice makers with alternate exemplary embodiments of separators.

A sizer such as the sizing shield 46 is preferably positioned substantially adjacent the ice coating 40 on the rotating drum 38. The sizing shield 46 should precede the ice breaker plate 42 by a sizing distance 48 (FIG. 5A). The size of the ice particles 24 is substantially determined by the sizing distance 48. As the sizing shield 46 holds the ice coating 40 on the rotating drum 38 the scraping edge 44 of the ice breaker plate 42 scrapes the ice coating 40 off the rotating drum 38.

The separator 27, mentioned generally above, may include one or more of a combination of apparatus that, alone or together, separate snow 25 from the ice particles 24 as they are created or shortly thereafter.

Figure 5B:
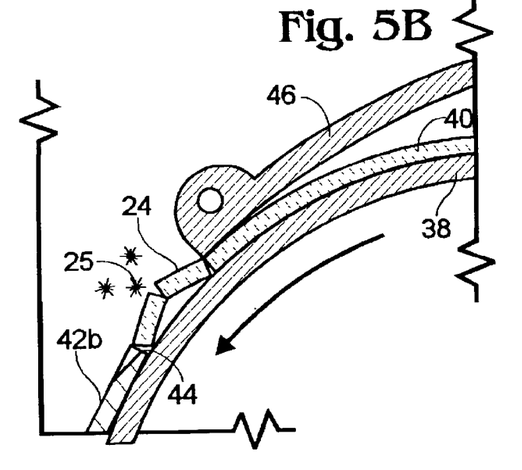

For example, one type of separator is a heated ice breaker plate 42a, 42b such as those shown in FIGS. 5A and 5B. Ice breaker plates 42a and 42b are substantially identical except for the angle at which they are placed relative to drum 38. Using the steeper angle shown in FIG. 5b, it is less likely that ice particles 24 or snow 25 will stick to the ice breaker plate 42b. Also the angle of an ice breaker plate 42a, 42b can be varied or set to direct all or part of the falling particles 24 and snow 25 to the steps 30, 31 of the hopper 28, 28', 28", 29.

The heated ice breaker plate 42a, 42b melts snow 25 that lands on it so that the snow 25 evaporates. Ice particles 24, on the other hand, are generally large enough to withstand the heating, and, therefore, are pulled down by gravity into the hopper 28, 28', 28", 29.

Another type of separator is a cooled ice breaker plate 42a, 42b such as those shown in FIGS. 5A and 5B. The cooled ice breaker plate 42a, 42b slows the snow 25 sufficiently, particularly if the plate is at the angle shown in FIG. 5B, so that it drifts slowly to the sides of the hopper 28, 28', 28", 29 and attaches itself thereto. Ice particles 24, on the other hand, are more likely to bounce off the sides of the hopper 28, 28', 28", 29.

Figures 3A, 3B, 6, 7:
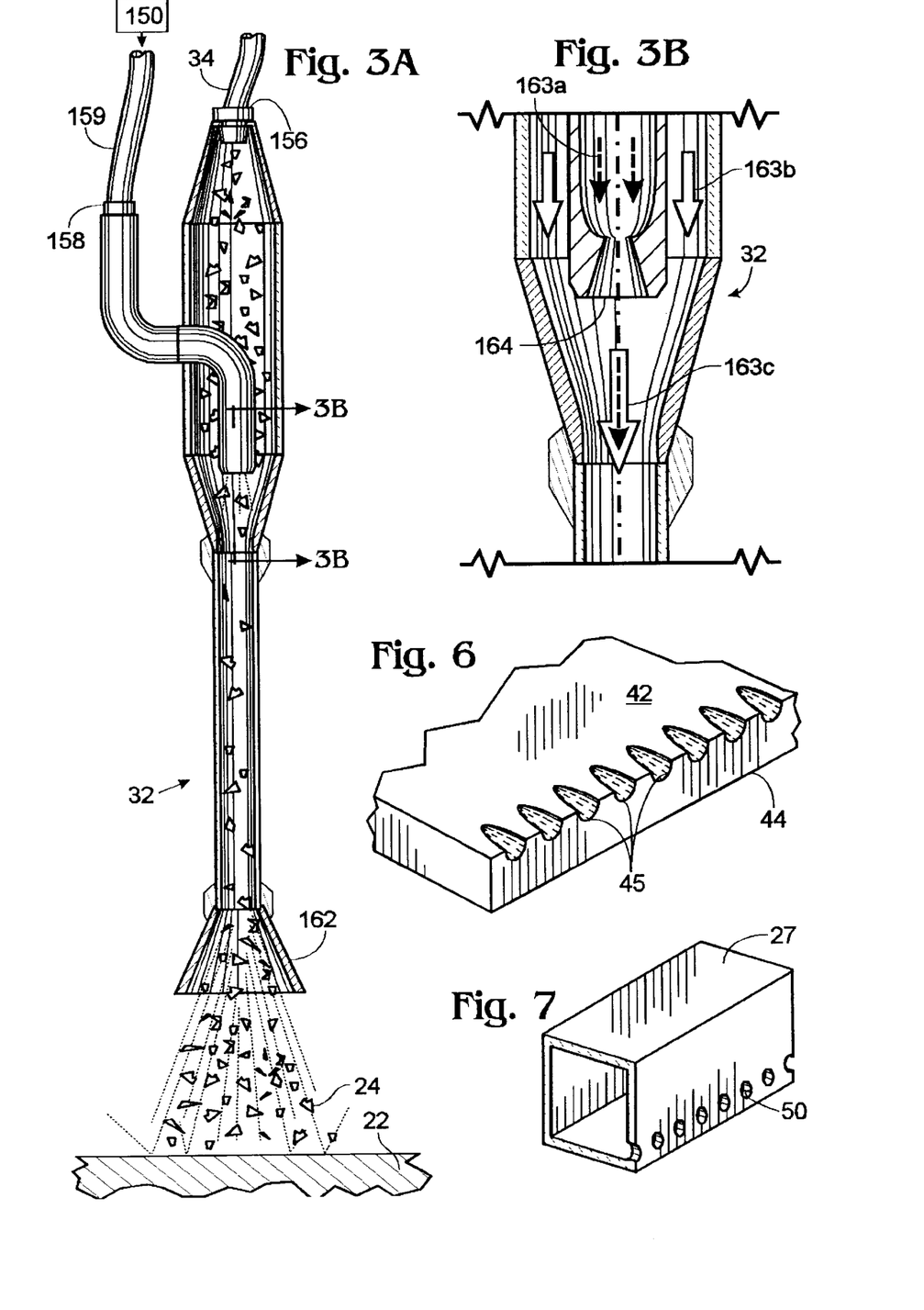
FIG. 3A is a cross-sectional side view of a blasting gun.
FIG. 3B is an enlargement of FIG. 3A taken along lines 3B—3B.
FIG. 6 is an enlarged perspective view of an ice breaker plate.
FIG. 7 is a perspective view of an air blower embodiment of the separator.
Figure 5C:
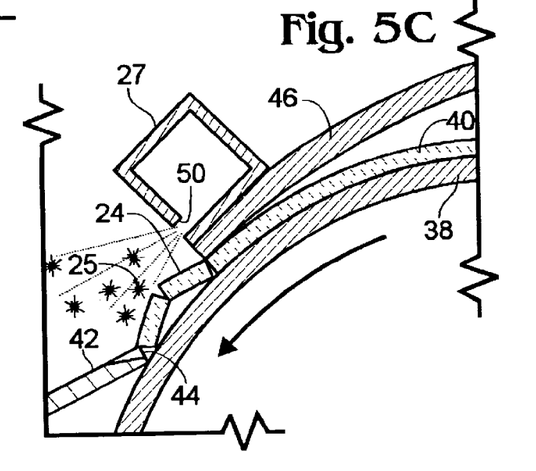

FIG. 5C shows another possible separator that includes a tubing 27 (shown as square) with at least one perforation 50. FIG. 7 shows a perspective view of the tubing 27 with perforations 50. As shown in FIG. 1, air from an air source 150 is supplied to the tubing 27 through a series of pipes or hoses 151. A flow control valve 152 or other controls 154 may be used to regulate the supply of air to the tubing 27. As shown, the air from the air supply 150 flows through the tubing perforations 50 along the area of the ice maker 26 at which the snow 25 and ice particles 24 are created. Because the snow 25 is light, the air blows the snow 25 upward and causes it to evaporate. On the other hand, ice particles 24 are generally too large to be blown upward or to evaporate significantly.

Figure 5D:
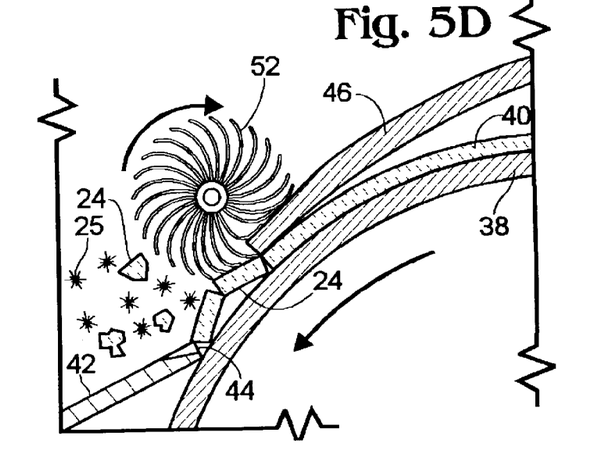

Yet another separator is shown in FIG. 5D. In this embodiment the separator is a roller brush 52 that rotates across the particles 24 and snow 25 as they are created. The rotation of the brush 25 pushes the particles 24 and snow 25 outward. Because the snow 25 is smaller, it tends to evaporate as it falls. Also, the weight difference between the particles 24 and the snow 25 causes snow 25 to drift farther than the particles 24. It should be noted that in addition to a roller brush 52, other mechanical means such as a wiper (not shown) can be used as a separator.

As mentioned above, the angle of the ice breaker plate 42, 42a, 42b may be varied (two such positions are shown in FIGS. 5A and 5B) to direct the particles or to vary the rate of fall of the particles. Also, the angle of the ice breaker plate 42, 42a, 42b will tend to determine how often particles 24 and snow 25 contact the ice breaker plate 42, 42a, 42b. Each time a particle 24 contacts the ice breaker plate 42, 42a, 42b it has the potential to break into smaller pieces and to simultaneously create more snow 25. Also, as shown in FIG. 6, notches 45 may be included in the ice breaker plate 42, 42a, 42b. The notches 45 lift the ice coating 40 and cause breakage without adding additional forces on the ice coating 40. Also, the notches 45 assure that the ice particles 24 are broken to a specific size.

The ice particles 24 are preferably pulled down by gravity downward into a hopper 28, 28', 28", 29. Each hopper 28, 28', 28", 29 preferably has a first opening 80 through which the ice particles 24 (and sometimes snow 25) enter. A second opening 82 is connected to the hose 34. It should be noted that the first opening 80 of the hopper 28 preferably has a first diameter and the second opening 82 preferably has a second diameter. Preferably the second diameter is smaller than the first diameter and the diameter generally decreases from the first diameter to the second diameter. By decreasing the diameter of the hopper 28, 28', 28", 29 the ice particles 24 are generally directed downward toward the second opening 82.

FIGS. 2A–2E show exemplary embodiments of hoppers 28, 28', 28", and 29. FIG. 2A shows a hopper 28 that has generally rounded sides 84. As shown, the sides 84 have a series of steps 30 such as those shown in cross section in FIG. 2D. FIGS. 2B and 2C show rectangular variations 28' and 28" of the hopper. FIG. 2B also shows a variation 28'in which some sides 84 have steps 30 and some sides 86 do not have steps. FIG. 2E shows yet another hopper 29. This hopper 29 has steps 31 that are similar to rungs on a ladder. These steps 31 function in a manner similar to steps 30, but would be less expensive to produce.

FIGS. 2D and 2E also show particles 24 and snow 25, herein after referred to as settlage 90 that has accumulated on the steps 30, 31 of the hoppers. In embodiments that direct snow 25 to the sides of the hoppers, snow 25 will form a substantial part of the settlage 90. In embodiments where the snow 25 is melted (FIG. 5C), most of the setlage 90 will be made of particles 24. The settlage 90 serves two main purposes. First, the settlage 90 acts as an insulator that keeps the temperature inside the hopper relatively cold. Second, the settlage 90 slowly melts and becomes water, hereinafter referred to as meltage 92. The meltage 92 mixes with and coats particles 24 as they exit the hopper through the second opening 82. Because the meltage 92 is very cold it helps protect the ice particles 24 from melting.

From the hopper 28, the ice particles 24 and meltage 92 are preferably pneumatically conveyed to the blasting gun 32. Within the blasting gun 32 the mixture is further accelerated and propelled toward the surface 22 to be cleaned.

The preferred embodiment of the blasting gun 32, shown generally in FIG. 1 and in detail in FIGS. 3A and 3B, receives the ice particles 24 and meltage 92 and propels the ice particles 24 and meltage 92 toward the surface 22 to clean it. The blasting gun 32 is preferably connected to the hose 34 at an ice particle opening 156. The blasting gun 32 is preferably connected to air source 150 at an air opening 158 by an air hose 159. Air flow may be controlled by a blast air control valve 160. The combined ice particles 24, meltage 92, and air exits through the gun exit nozzle 162.

FIG. 3B shows that the air flow 163a (shown as dashed arrows) is introduced centrally through the central air flow nozzle 164 into the blasting gun 32. The ice particle flow 163b (shown as open arrows) flows essentially around the air flow 163a. The air flow 163a and ice particle flow 163b combine to become a combination flow 163c (shown as a the combined arrow) that flows through the gun exit nozzle 162. This configuration, and the added air flow 163a, acts as a venturi that pulls forward the ice particles 24 from behind the entrance of the air flow 163a. As mentioned above, the combined ice particles 24, meltage 92, and air exit through the gun exit nozzle 162.

Because the ice particles 24 that emanate from the gun exit nozzle 162 have been slowly melting as they travel through the system 20 and have collided and broken along the way, they may be of a small, medium, or large size. Each size serves a specific purpose as it emanates from the blasting gun 32 and impacts the surface 22. The smallest particles sublimate as they hit the surface 22 to help fracture the unwanted surface coatings. The medium sized particles melt into water as they hit the surface 22 and therefore assist in washing away the coating. The largest particles bounce off the surface 22 as they hit.

It should be noted that air source 150 is preferably compressed air. High, medium, and low pressure compressed air may be used and it may be any temperature. One of the features of this invention is that the compressed air may be at ambient temperature, so no cooling or drying equipment is required. The flow of the air pressure may be controlled through flow control devices 152, 154, and 160.

Figure 8:
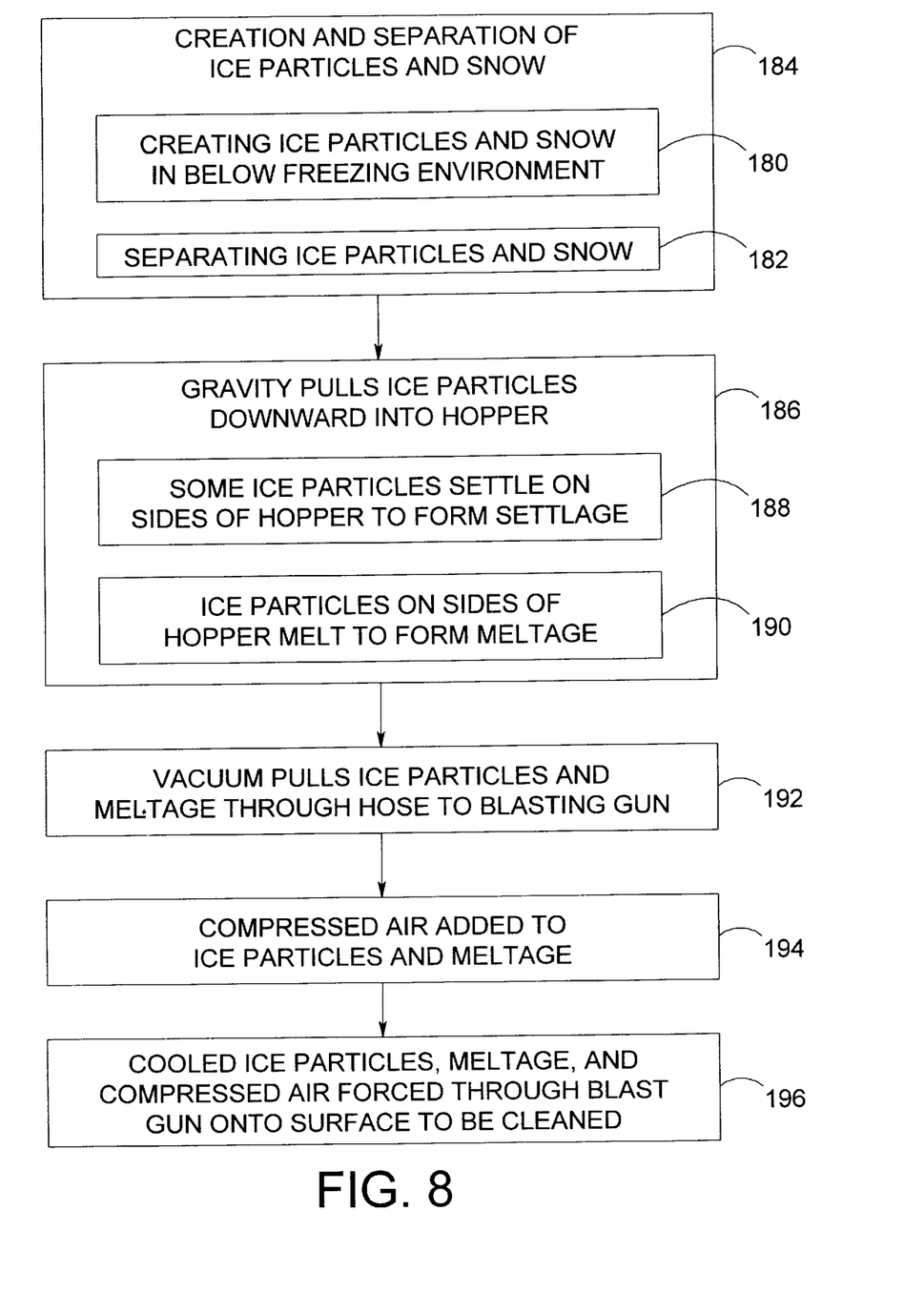
FIG. 8 is a flow chart depicting the ice blasting method of the present invention.

The present invention, as shown in FIG. 8, also includes an ice blasting cleaning method for cleaning a surface 22 with ice particles 24. The first step of the cleaning method is to create ice particles and snow in a below freezing environment 180. As the ice particles and snow are being created, they are almost instantaneously separated from each other 182. After the ice particles and snow have been created and separated 184 gravity pulls the ice particles downward to the hopper 186. Some ice particles settle on the sides of the hopper to form settlage 188. This particularly true when a stepped hopper is used. The settled ice particles tend to act as insulation maintaining a relatively cool ambient temperature. However, some of the ice particles on the sides of the hopper melt to form meltage 190. The ice particles and meltage exit from the hopper as a vacuum pulls the ice particles and meltage through a hose to a blasting gun 192. Within the blasting gun compressed air is added to the ice particles and meltage 194. As is evidenced by condensation on the outside of the blasting gun, the combined ice particles, meltage, and compressed air is cooled and then forced through the blast gun onto a surface to be cleaned 196.

The above apparatus and method, unlike the prior art systems that only work in a cold environment (below freezing and generally in the range of 0° F. to 15° F.), works well in warmer environments. Although ice particles 24 are created at below freezing (or simply supplied), the rest of the system 20 functions in a generally warm environment that is above freezing. There are several advantages to this feature including that the system 20 does not require additional cooling and does not experience the ice build-ups and plug-ups associated with previous systems.

Previous systems have been designed to work at below freezing temperatures because it was thought that to transport ice particles over any significant distance (or to prepare or handle ice in general) the particles would have to be kept below freezing. The present system 20, however, takes advantage of the fact that ice melts very slowly when it is at temperatures just above freezing. However, if previous systems were simply stripped of their cooling apparatus, they would not function because the ice particles would melt before they could be effective in ice blasting. Further, these stripped systems would be plagued by plug-ups and adherence problems as the ice particles stuck to the apparatus and each other. The system 20 of the present invention, however, has several temperature controlling features that keep the system 20 in a temperature range of just above freezing to up to 50° F. In this temperature range the ice particles 24 can be transported while they are slowly melting, but still effective for ice blasting cleaning.

The first temperature controlling feature is the insulation provided by the settlage 90 on the steps 30 of the hopper 28. This insulation keeps the environment in the hopper 28 relatively cold. The second temperature controlling feature is that the ice particles 24 is mixed with meltage 92 as it enters the hose 34. The meltage 92, which is about 32° F., serves as a heat capacitor to protect the ice particles 24 from melting. This is true because it takes significant energy to raise the temperature of water such as the meltage even one degree. Comparatively, it takes very little energy to raise the temperature of air that in previous systems was used to maintain the temperature below freezing. The third temperature controlling feature is that the ice particles 24 travel very rapidly through the system 20.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:

1. An ice blasting cleaning method for cleaning a surface with ice particles, said method comprising the steps of:
    (a) creating said ice particles and snow;
    (b) separating said ice particles from said snow;
    (c) said ice particles entering a hopper;
    (d) propelling said ice particles toward said surface.

2. The method of claim 1 wherein said step of separating is performed simultaneously with said step of creating.

3. The method of claim 1 wherein said step of separating includes blowing warm air on said ice particles and said snow.

4. The method of claim 1 wherein said step of separating includes angling an ice breaker plate at a steep angle relative to a drum of an ice maker.

5. The method of claim 1 wherein said step of separation includes heating an ice breaker plate to melt said snow.

6. The method of claim 1 wherein said step of separation includes cooling an ice breaker plate to slow snow settled thereon.

7. The method of claim 1 wherein said step of separation includes applying a rotating brush to said ice particles.

8. The method of claim 1 further comprising the step of a portion of said ice particles settling on sides of said hopper to form settlage after said ice particles have entered said hopper.

9. The method of claim 8 further comprising the step of said settlage melting to form meltage after said ice particles have settled on said sides of said hopper.

10. The method of claim 9 wherein said step of propelling said ice particles toward said surface further comprises the step of propelling said meltage toward said surface.

11. The method of claim 8 wherein said step of propelling said ice particles further comprises the sep of adding air to said ice particles.

12. An ice blasting cleaning method for cleaning a surface with ice particles, said method comprising the steps of:
    (a) creating ice particles and snow in a below freezing environment;
    (b) separating said ice particles from said snow;
    (c) increasing the velocity of said ice particles in an above freezing environment; and
    (d) propelling said ice particles toward a surface to be cleaned.

13. An ice blasting cleaning system for cleaning a surface with ice particles, said system comprising:
    (a) an ice maker that creates said ice particles and snow;
    (b) at least one separator that separates said snow from said ice particles;
    (c) a hopper having a first opening and a second opening, said ice particles entering said hopper at said first opening; and
    (d) a blasting gun connected to said second opening of said hopper, said blasting gun receiving said ice particles and propelling said ice particles toward said surface.

14. The system of claim 13 wherein said at least one separator is an air blower.

15. The system of claim 14 wherein said air blower blows warm air.

16. The system of claim 14 wherein said airblower has a length of tubing having at least one aperture.

17. The system of claim 13 wherein said ice maker is a drum ice maker having a rotating drum, and said at least one separator is an ice breaker plate set at a steep angle relative to said drum.

18. The system of claim 13 wherein said at least one separator is a heated ice breaker plate.

19. The system of claim 13 wherein said at least one separator is a cooled ice breaker plate.

20. The system of claim 13 wherein said at least one separator is a rotating brush.

21. The system of claim 20 wherein said rotating brush rotates against said snow and ice particles as they are created so as to separate said snow from said ice particles as they are created.

22. The system of claim 13 wherein said ice maker is a horizontal drum ice maker, said ice maker comprising:
    (a) a water source for supplying water;
    (b) a cooled rotating drum coatable by said water, said rotating drum suitable to freeze an ice coating thereon;
    (c) an ice breaker plate with a scraping edge, said ice breaker plate positioned at an angle to said rotating drum, said scraping edge substantially adjacent to said rotating drum;
    (d) a sizer positioned at a slight distance from said rotating drum;
    (e) whereby said sizer holds said ice coating on said rotating drum while said ice breaker plate scrapes said ice coating off said rotating drum to create ice particles and snow.

23. The system of claim 13 wherein said hopper has sloped sides suitable for collecting settling ice particles.

24. The system of claim 23, said blasting gun connected to said hopper to receive melting ice particles and propelling said melting ice particles toward said surface.

25. The system of claim 13 wherein said hopper has stepped sides suitable for collecting settling ice particles.

26. The system of claim 13 wherein said hopper has sides with rungs suitable for collecting settling ice particles.

* * * * *